United States Patent [11] 3,629,060

| [72] | Inventor | David Schmidt |
| | | Erlenbach, Zurich, Switzerland |
| [21] | Appl. No. | 773,260 |
| [22] | Filed | Nov. 4, 1968 |
| [45] | Patented | Dec. 21, 1971 |
| [73] | Assignee | Sulzer Brothers Limited |
| | | Winterthur, Switzerland |
| [32] | Priority | Nov. 8, 1967 |
| [33] | | Switzerland |
| [31] | | 15612/67 |

[54] CLOSED-CYCLE GAS TURBINE NUCLEAR POWERPLANT
1 Claim, 1 Drawing Fig.

[52] U.S. Cl. ................................... 176/20, 176/60
[51] Int. Cl. ................................... G21c 7/00
[50] Field of Search .......................... 176/20, 60

[56] References Cited
UNITED STATES PATENTS

| 3,065,162 | 11/1962 | Hub | 176/20 X |
| 3,152,962 | 10/1964 | Kagi | 176/60 |
| 3,162,581 | 12/1964 | Brunner | 176/60 |
| 3,180,798 | 4/1965 | Brunner | 176/60 |
| 3,377,800 | 4/1968 | Spillman | 176/60 |
| 3,410,091 | 11/1968 | Frutschi | 176/60 |

Primary Examiner—Reuben Epstein
Attorney—Pennie, Edmonds, Morton, Taylor and Adams ABSTRACT: A gas turbine powerplant includes a nuclear source of heat, a gas turbine, a cooler, and a compressor connected into a closed cycle. A bypass is connected around the compressor, and a reservoir for the working substance is connected into the cycle through separately valved lines upstream and downstream of the compressor. A load or speed responsive regulator controls these lines, and also a valve in the bypass. Means are provided to generate a signal representative of the time rate of change of pressure in the cycle in the vicinity of the reactor, and this signal, when it exceeds a threshold value, controls operation of the regulator to limit the pressure variations of the working substance in the reactor.

PATENTED DEC 21 1971 3,629,060
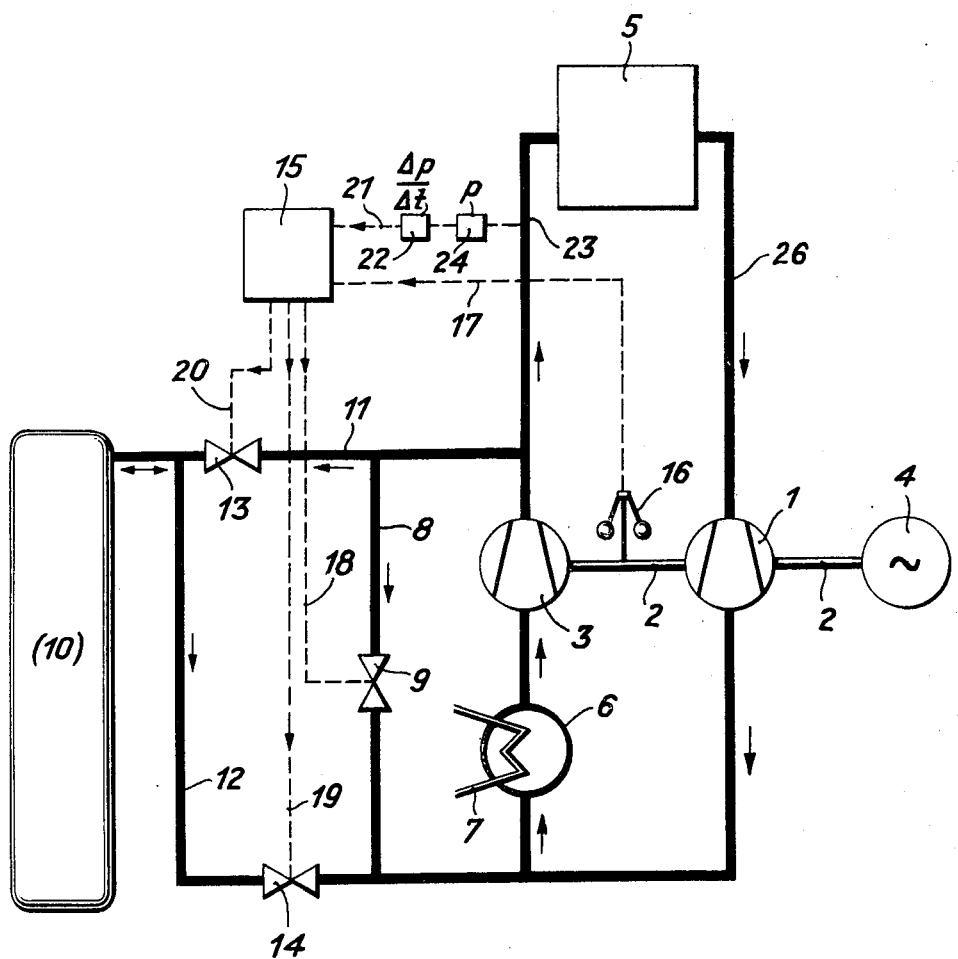
Inventor:
David Schmidt
BY Pennie, Edmonds,
Morton, Taylor and Adams
ATTORNEYS

CLOSED-CYCLE GAS TURBINE NUCLEAR POWERPLANT

The present invention relates to a closed-cycle gas turbine powerplant in which a nuclear reactor serves directly as the source of heat and in which the output power delivered by the plant is regulated by means of at least one bypass line having a valve therein short circuiting the compressor stages and by adjustment of the pressure level in the cycle with the aid of at least one reservoir connected thereto.

It is known that the heat produced in a nuclear reactor can be converted into electricity in a closed-cycle gas turbine powerplant in which the reactor coolant, e.g., helium or $CO_2$, is used as the working substance. In one such known power plant, small changes in output are compensated or smoothed out by varying the flow of working substance through a bypass line around the compressor stages of the plant, in response for example to changes in speed of the gas turbine. Operation of the plant is matched to large changes in load thereon by withdrawal of part of the working substance from the cycle or by addition of working substance thereto. It is an object of the present invention to limit the variations in pressure in the cycle of such a plant, in order to protect the fuel elements of the reactor.

According to the invention, there is supplied to the output regulator of the plant an additional signal representative of the time rate of change of pressure of the working substance in that part of the flow cycle of the working substance which contains the reactor, and this signal operates on the regulator in such a way that the variations of reactor pressure with time do not exceed a certain value.

The invention is intended to prevent both slow, long-continuing pressure fluctuations, which lead to large pressure differences in the reactor, and brief fluctuations with sharp pressure differences, whereas transient pressure changes whose resulting pressure differences do not exceed a certain value are ignored in order to avoid hunting in the power-regulating system. These requirements are satisfied by allowing the rate-of-change signal, employed as a correction signal to the output power regulator, to become effective only when its value exceeds a specified minimum.

A further advantage of the control system of the invention resides in the fact that it protects against excessive pressure differences double-walled pipes which may be employed in the plant and which comprise a cold high-strength outer wall and a thin hot inner wall with a gas-permeated layer of insulating material in between. These double-walled pipes are preferably used in the hot zone of the plant, that is, primarily to connect the reactor and the turbine.

BRIEF DESCRIPTION OF THE DRAWING

The invention will now be further described in terms of a presently preferred nonlimitative exemplary embodiment thereof as illustrated in the accompanying drawing wherein the sole FIGURE shows in schematic form a gas turbine power plant according to the invention. In the drawing, heavy single lines are employed to indicate the flow path for the working substance while dashed lines indicate signal channels.

DESCRIPTION OF PREFERRED EMBODIMENT

In the single-shaft powerplant shown in the drawing, a gas turbine 1, a cooler 6, a compressor 3, and a nuclear reactor 5 are connected into a closed cycle as indicated at 26 through which the $CO_2$ working substance flows in the direction indicated by the arrows. By means of a shaft 2 the gas turbine 1 drives the compressor 3 and also an electric generator 4, which constitutes the useful output load of the plant. Heat is supplied to the working substance e.g., helium or $CO_2$, on its passage through the nuclear reactor 5 while the cooler 6 serves to remove heat from the working substance, the heat so removed being transferred to a coolant such as water flowing through the coil 7 in the cooler.

The output delivered by the plant is regulated in the first instance by a bypass line 8 that short circuits the compressor 3 and cooler 6 and is fitted with an adjustable regulating valve 9. This line 8, leading from a point of maximum pressure in cycle 26 downstream of compressor 3 to a point of minimum pressure therein upstream of that compressor, serves primarily for adjustment of the plant to small fluctuations in load thereon.

In the case of larger load fluctuations, working substance is withdrawn from the cycle 26 and transferred to a reservoir 10 or withdrawn from the reservoir and introduced into the cycle, as the case may be. For this purpose the reservoir 10 is connected to line 8 in parallel with valve 9 by means of lines 11 and 12, fitted with simple two-position valves 13 and 14.

In the illustrated example the plant is regulated from regulator 15, which responds primarily to a signal delivered from tachometer 16 on shaft 2 via a signal channel 17. The output signals from regulator 15, which actuate valves 9, 13 and 14, are communicated to these valves through signal channels 18, 19, and 20.

In accordance with the invention regulator 15 receives an additional input signal which acts as a threshold signal in the operation of the regulator and affects the regulating system only when the time rate of pressure change ($\Delta p/\Delta t$) in that part of the cycle adjacent the reactor 5 exceeds a minimum or threshold value. This additional signal, representative of the time rate of change of pressure ($\Delta p/\Delta t$) in that part of the cycle adjacent the reactor 5, is generated in the differentiator 22 from a pressure-representative signal delivered to it by the device 24, which measures the pressure in the cycle 26 at a point immediately upstream of the reactor 5. In addition, this signal is compared in element 22 with a fixed or adjustable minimum value therefor.

The power output of the plant is so regulated as a function of shaft speed that for small speed variations part of the working substance compressed in compressor 3 is returned through line 8 to the input to cooler 6 without flowing through the reactor 5 or turbine 1 and hence without doing any work in the latter. The amount so bypassed is varied by adjusting the valve 9. In the event of larger load fluctuations, as already mentioned, part of the working substance is withdrawn from the cycle 26 or additional working substance is inserted therein, as the case may be. This is achieved by opening and closing valves 13 and 14. If in the event of a fall in load gaseous working substance is to be withdrawn from the cycle, valve 13 which is connected by line 11 with a high-pressure point of the cycle, is opened. Since the pressure in reservoir 10 is lower than than downstream of compressor 3, a certain amount of gas flows into the reservoir. In the opposite case a certain amount of gas can be transferred from reservoir 10 to the cycle 26 by opening valve 14. Valves 13 and 14 are always so set that at least one of them is closed, in order to avoid creating another bypass in the system in addition to line 8.

Power output regulation by transfer of working substance between the working cycle and a reservoir is known in and of itself. It is also known that such regulation may lead to considerable pressure fluctuations in the cycle, which may have a particularly harmful effect on the fuel elements and the coolant system of the reactor 5 which forms part of that cycle.

In accordance with the invention excessive pressure variations in the reactor zone and hence in the double-walled pipes used in the hot part of the plant between reactor and turbine are avoided by operation of the correcting signal transmitted to the regulator through channel 21.

This signal acts on the regulation as soon as the threshold value for time rate of pressure fluctuations present in element 22 is exceeded. Further in accordance with the invention, time rate of pressure change signals which do exceed this threshold and which are therefore delivered via channel 21, predominate in regulator 15 over the signal from tachometer 16 and cause valves 9, 13 and 14 to be actuated in such a way as to offset the existing pressure fluctuations.

The invention is, of course, not limited to the embodiment shown. It can be applied in the same way to two- or multi-shaft plants with several compression and expansion stages. In addition, the primary shaft speed-representative signal of the embodiment described can be replaced by another signal representative of the required output. The invention thus includes all modifications of and departures from the embodiment hereinabove described properly following within the spirit and scope of the appended claim.

I claim:

1. A closed-cycle gas turbine power plant comprising a nuclear heat source, a gas turbine, a cooler and a compressor connected into a closed cycle, a bypass around the compressor, a valve in the bypass, a reservoir for working substance, a flow control means connecting the reservoir to the cycle, a regulator for adjustment of said valve and flow control means in response to changes in load on the plant, and means to generate a signal representative of time rate of change of pressure of the working substance in the reactor as an input to said regulator to limit pressure variations in the reactor.

* * * * *